(12) United States Patent
Eibye

(10) Patent No.: US 7,657,281 B2
(45) Date of Patent: Feb. 2, 2010

(54) METHODS OF DYNAMICALLY CHANGING INFORMATION PROVIDED ON A DISPLAY OF A CELLULAR TELEPHONE AND RELATED CELLULAR TELEPHONES

(75) Inventor: Anders Bertram Eibye, Copenhagen D (DK)

(73) Assignee: Sony Ericsson Mobile Communications AB, Lund (SE)

( * ) Notice: Subject to any disclaimer, the term of this patent is extended or adjusted under 35 U.S.C. 154(b) by 470 days.

(21) Appl. No.: 11/619,800

(22) Filed: Jan. 4, 2007

(65) Prior Publication Data

US 2008/0167078 A1 Jul. 10, 2008

(51) Int. Cl.
*H04B 1/38* (2006.01)
*H04M 1/00* (2006.01)

(52) U.S. Cl. .................................... 455/550.1; 455/566
(58) Field of Classification Search ... 455/556.1–556.2, 455/566
See application file for complete search history.

(56) References Cited

U.S. PATENT DOCUMENTS

2001/0029193 A1* 10/2001 Ishigaki ....................... 455/566
2003/0040340 A1*  2/2003 Smethers ..................... 455/566
2004/0077340 A1*  4/2004 Forsyth ..................... 455/414.1
2004/0266458 A1   12/2004 Kataoka
2006/0030370 A1*  2/2006 Wardimon ................... 455/566
2006/0187217 A1*  8/2006 Son et al. .................... 345/204
2006/0290661 A1* 12/2006 Innanen et al. .............. 345/156
2007/0011610 A1*  1/2007 Sethi et al. .................. 715/700

FOREIGN PATENT DOCUMENTS

WO     WO 02/17075 A2   2/2002
WO     WO 02/052815 A2  7/2002
WO     WO 03/075547 A2  9/2003

OTHER PUBLICATIONS

International Search Report and Written Opinion for PCT/EP2007/055044; date of mailing Sep. 25, 2007.

* cited by examiner

*Primary Examiner*—Simon D Nguyen
(74) *Attorney, Agent, or Firm*—Myers Bigel Sibley & Sajovec

(57) ABSTRACT

Methods of displaying information on a display of a cellular telephone are provided in which information from at least a first of a plurality of standby screen applications is displayed on the display of the cellular telephone while the cellular telephone is in a standby mode. A second of the plurality of applications is then automatically selected based on a set of pre-defined rules. Thereafter, the displayed information from the first of the plurality of applications is replaced with information from the second of the plurality of applications while the cellular telephone remains in the standby mode. Related cellular telephones and computer program products are also provided.

15 Claims, 6 Drawing Sheets

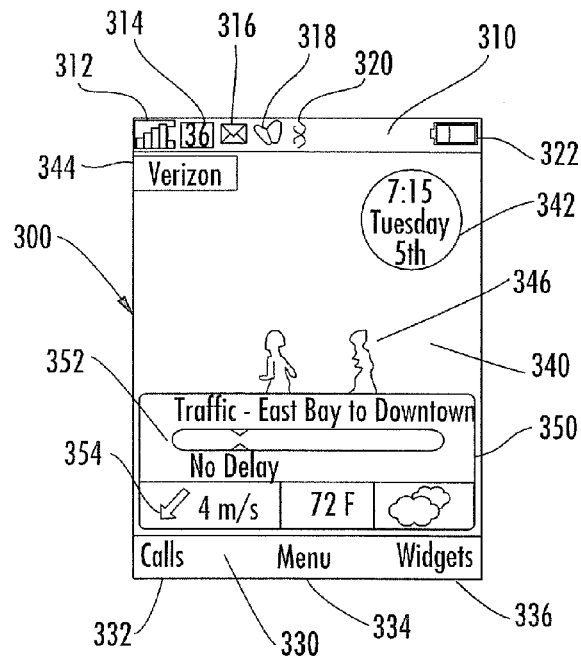
FIG. 4A
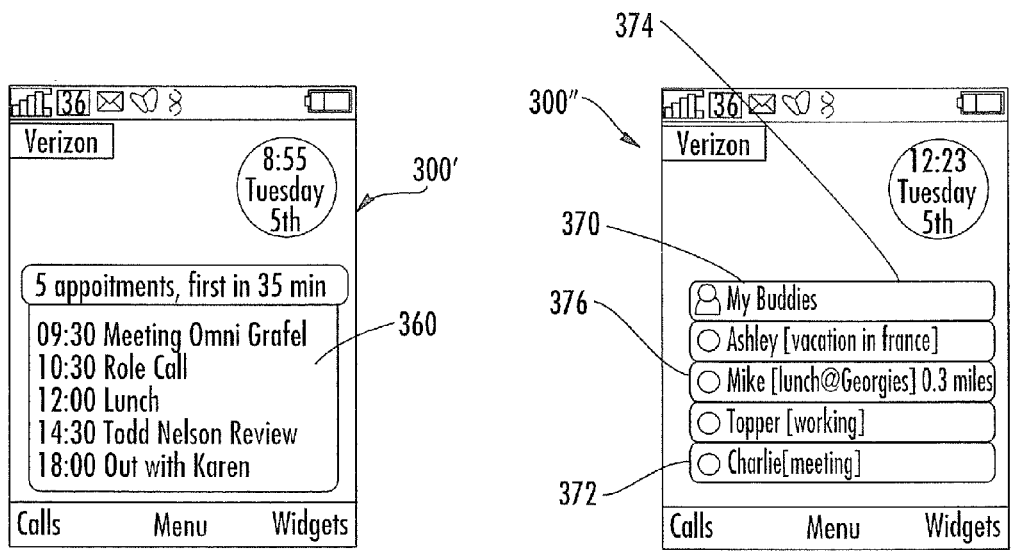
FIG. 4B
FIG. 4C

METHODS OF DYNAMICALLY CHANGING INFORMATION PROVIDED ON A DISPLAY OF A CELLULAR TELEPHONE AND RELATED CELLULAR TELEPHONES

FIELD OF THE INVENTION

The present invention relates to cellular telephones, and more particularly, to cellular telephones including user interfaces and related methods of displaying information on such user interfaces.

BACKGROUND OF THE INVENTION

The vast majority of state-of-the-art cellular telephones include at least one display screen. Most state-of-the-art cellular telephones also include a plurality of applications such as, for example, games, appointment book applications, address books, call history logs, cameras, photo galleries, and the like. Typically, the display screen is used to access and operate these applications. The display screen also typically displays information when a conventional cellular telephone is used to make or receive a telephone call, such as the dialed or incoming telephone number, the connection status, the length of the call, etc.

When a conventional cellular telephone is in a "standby mode", its display screen will typically either be blank or will display a "standby screen." Herein, the term "standby mode" refers to a mode of the cellular telephone where the cellular telephone does not have an active ongoing telephone call connection and where a user of the cellular telephone is not actively running other applications that require user input such as games, calendar applications, address book applications, message retrieval, photo viewing and the like. The term "standby screen" refers to the information that is displayed on the display screen of the cellular telephone while the telephone is in the standby mode. While the information provided on the standby screen of a conventional cellular telephone may differ depending upon the manufacturer/model of the telephone and/or the cellular service provider, typically the information displayed includes the time of day, an icon indicating the signal strength of a signal received from a cellular base station, an icon indicating the remaining battery power, and perhaps the name of the cellular service provider. The standby screen may also include, for example, menu access points, other indicia regarding the options currently set on the cellular telephone (e.g., volume level, mute function, etc.) and/or additional information regarding the services that are currently available from the cellular service provider (e.g., current availability of data transmission and reception services). A user of the cellular telephone may also often adjust the background picture provided on the standby screen by selecting from a variety of options or by selecting a photograph that replaces a pre-set background picture or pattern.

FIG. 1A depicts a standby screen 20 that may be displayed on a display screen 15 of an exemplary conventional cellular telephone 10. As shown in FIG. 1, the standby screen 20 of cellular telephone 10 may include a signal strength indicator 30, a remaining battery power indicator 32, a GPRS availability indicator 34, the name 36 of the cellular service provider that operates the cellular base station to which the cellular telephone is currently assigned, the date 38 and the current time 40. Several labels 44 may also be provided that indicate menus that can be opened by pressing corresponding soft keys that are located under respective of the labels 44 on a keypad of cellular telephone 10.

When an unread message (e.g., voice mail, e-mail, text message, etc.) is available and/or a call has been received that the user did not answer, the standby screen 20 may be updated to include an icon or message window notifying the user of the availability of the message or the telephone number of the missed call. FIG. 1B shows such an updated standby screen 20 that includes an unread message indicator 46 and a window 48 with a message notifying the user that a message has been received.

SUMMARY

Pursuant to embodiments of the present invention, methods of displaying information on a display of a cellular telephone are provided. Pursuant to these methods, information from at least a first of a plurality of applications is displayed on the display while the cellular telephone is in a standby mode. Then, a second of the plurality of applications is automatically selected based on a set of pre-defined rules, and the displayed information from the first of the plurality of applications is thereafter automatically replaced with information from the second of the plurality of applications while the cellular telephone remains in the standby mode. In some embodiments, the method may also involve displaying information from a third of the plurality of applications in response to a received command.

In some embodiments, the second of the plurality of applications is automatically selected based on at least one of a time of day, a day of the week, a location of the cellular telephone and/or a location of another cellular telephone. In those and/or other embodiments, the set of pre-defined rules may include a rule that selects the second of the plurality of applications based at least in part on (1) a temporal parameter, (2) a location of the cellular telephone and/or (3) a location of the cellular telephone relative to another location. In still other embodiments, the second of the plurality of applications may be automatically selected based on a determination that at least two different criteria have been satisfied such as, for example, a temporal criterion and/or location criterion. At least some of the set of pre-defined rules may be pre-programmed into the cellular telephone. A user of the cellular telephone may also and/or alternatively provide parameters that are used to establish at least some of the set of pre-defined rules. At least some of the above-described methods may be carried out by a computer program product that is stored in a memory of the cellular telephone.

Pursuant to further embodiments of the present invention, methods of displaying information on a display associated with a cellular telephone are provided in which information from at least a first of a plurality of applications is displayed on the display while the cellular telephone is in a standby mode. Then, a second of the plurality of applications is automatically selected based on at least one of a temporal parameter and/or a location of the cellular telephone. Thereafter, information from the second of the plurality of applications is automatically displayed while the cellular telephone remains in the standby mode. The information from the second of the plurality of applications may comprise, for example, weather-related information or traffic-related information. The method may also involve providing an audible or vibrating notification that the displayed information from the first of the plurality of applications has been replaced with information from the second of the plurality of applications. In these methods, the display may be part of the cellular telephone or may be a display on a device separate from the cellular telephone that receives information from the cellular telephone via a wireless communications link.

Pursuant to further embodiments of the present invention, cellular telephones are provided which include a transceiver, a user interface that includes a first display and a memory, each of which are coupled to a processor. These cellular telephones further include a plurality of applications that are configured to run on the processor. These applications may generate information that may be displayed on the first display when the cellular telephone is in standby mode. These cellular telephones also include a control application that is configured to automatically adjust what of the information generated by the plurality of applications is displayed on the first display while the cellular telephone is in standby mode based on at least one of a time of day criteria b, a day of the week criteria and/or criteria involving a location of the cellular telephone being satisfied.

In some embodiments, the control application may be configured to replace information provided by a first of the plurality of applications with information provided by a second of the plurality of applications based on at least one of a time of day criteria, a day of the week criteria and/or criteria involving a location of the cellular telephone being satisfied. The plurality of applications may include applications that provide, for example, weather-related information and/or traffic-related information.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings:

FIGS. 4A-4C are diagrams of standby screens of cellular telephones according to certain embodiments of the present invention.

DETAILED DESCRIPTION

Figure 1A:
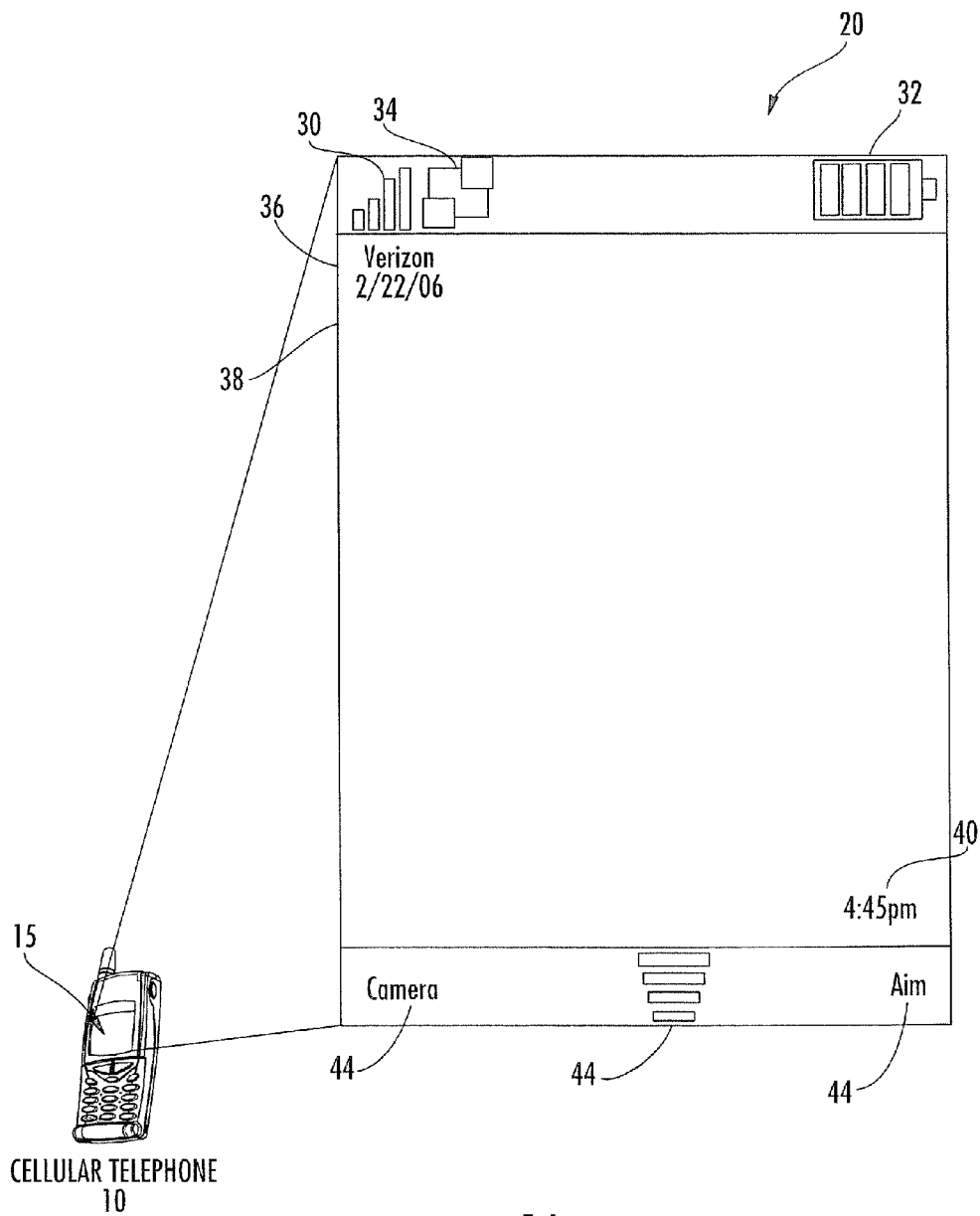
FIG. 1A is a depiction of a typical standby screen that may be displayed on the display screen of a conventional cellular telephone.
Figure 1B:
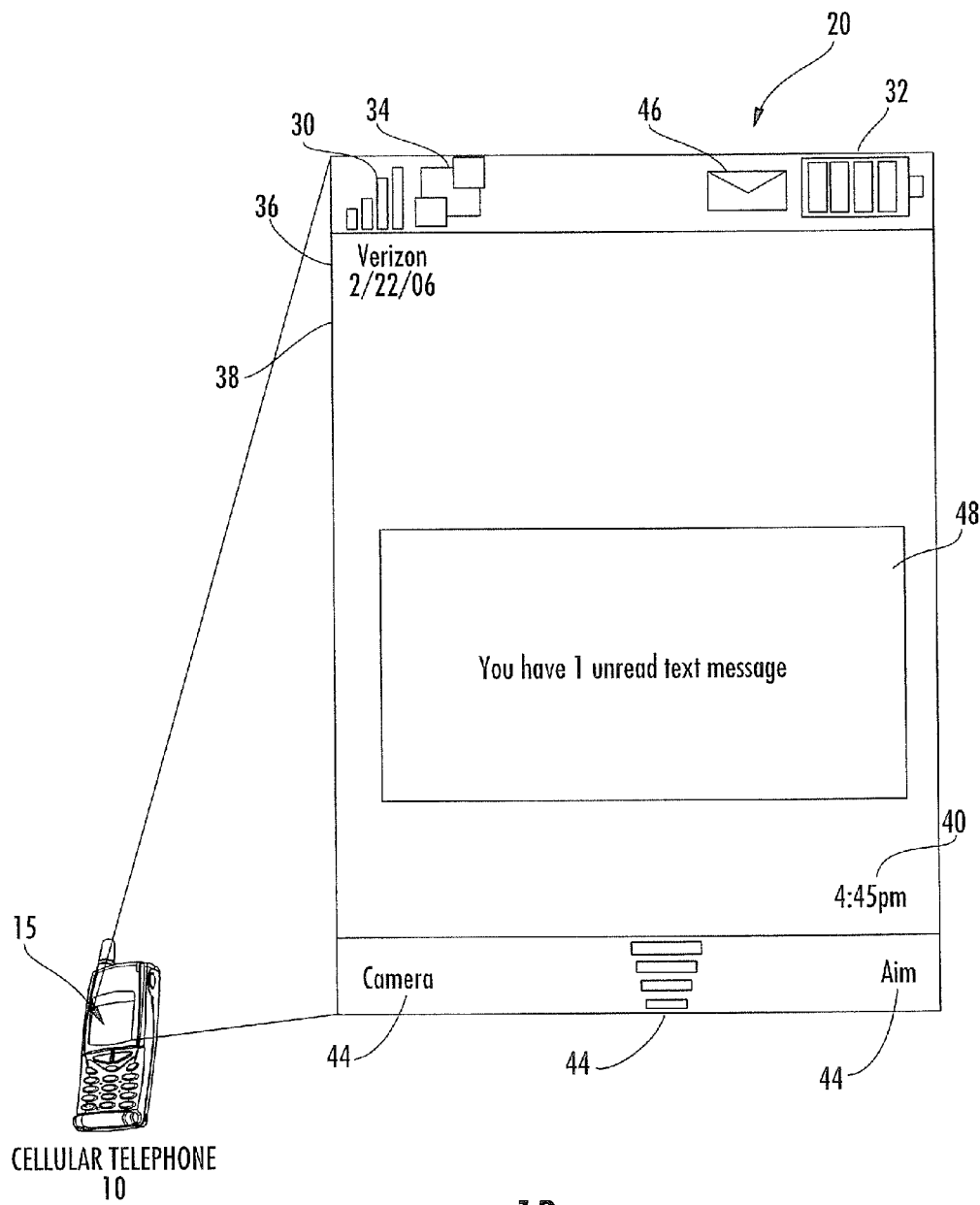
FIG. 1B is a depiction of how the conventional standby screen of FIG. 1A may change after a message is received.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Relative terms such as "below" or "above" or "upper" or "lower" or "horizontal" or "vertical" may be used herein to describe a relationship of one element or region to another element or region as illustrated in the figures. It will be understood that these terms are intended to encompass different orientations of the device in addition to the orientation depicted in the figures.

Herein, the term "cellular telephone" refers to any portable radio telecommunication terminal that includes a telephone component specifically including mobile telephones, smartphones and personal digital assistants that include cellular telephone functionality.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

As will be appreciated by one of skill in the art, the present invention may be embodied as a method, device, data processing system and/or computer program product. Accordingly, embodiments of the present invention may take the form of an entirely hardware embodiment, an entirely software embodiment or an embodiment combining software and hardware aspects all generally referred to herein as a "circuit" or "module." Furthermore, embodiments of the present invention may take the form of a computer program product on a computer-usable storage medium having computer-usable program code embodied in the medium. Any suitable computer readable medium may be utilized including, for example, hard disks, CD-ROMs, non-volatile memories, optical storage devices and/or magnetic storage devices.

Computer program code for carrying out operations of the present invention may be written, for example, in an object oriented programming language such as, for example, Java®, Smalltalk or C++, in conventional procedural programming languages, such as the "C" programming language and/or in other programming languages. The program code may execute entirely on a cellular telephone, partly on a cellular telephone and partly on a remote processing system or entirely on the remote processing system. In the last two scenarios, the remote processing system may be connected to the cellular telephone via a cellular network.

The present invention is described below with reference to flowchart illustrations and block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be stored in a computer-readable memory and may be provided to or loaded in a processor or other programmable data processing apparatus to cause a series of operational steps to be performed to produce a computer implemented process such that the instructions which execute on the processor or other programmable data processing apparatus create means and/or provide steps for implementing the functions/acts specified in the flowchart and/or block diagram block or blocks.

Pursuant to embodiments of the present invention, cellular telephones are provided that have enhanced standby screens that provide more useful information to a user of the cellular telephone. Methods of operating cellular telephones are also provided that may be used to dynamically control the information that is included on the standby screen. The cellular telephones and methods of operating such devices according to embodiments of the present invention may be used to provide information, at the right time, and in the right context, to a user of the cellular telephone. This information may be conveniently displayed on the standby screen of the cellular telephone, which is the screen of the user interface that most cellular telephone user's may view most often.

In some embodiments of the present invention, the cellular telephone may include a plurality of "standby screen" applications. A "standby screen application" is an application that generates information that may be displayed on a display of the cellular telephone while the cellular telephone is in the standby mode. Some or all of the plurality of standby screen applications are kept running while the cellular telephone is in the standby mode. Information provided by selected of the standby screen applications is then included on a standby screen of the cellular telephone.

Most or all of the standby screen applications may comprise "widgets." A "widget" refers to a small, self-contained application that has its own behavior and functionality that provides the user of the cellular telephone with "at-a-glance" information. By "at-a-glance" information it is meant that the user of the cellular telephone need only look at the displayed standby screen to obtain the information without, for example, having to traverse a menu, select an option, push a button, etc. Examples of the information that might be provided by widgets according to embodiments of the present invention are current weather conditions, weather forecasts, traffic updates, appointment summaries, task lists and the like.

The standby screen applications may provide valuable information to a user without requiring much effort on the part of the user to obtain this information. However, there are challenges involved in implementing these applications on a mobile cellular telephone. The first such challenge is the screen size of the display(s) provided on most cellular telephones. Typically, cellular telephone display screens have a diagonal measurement of between about one to about three inches (although both smaller and larger display screens are provided on certain models). Thus, the area of the display screen may range from less than one to perhaps four or five square inches (and perhaps 7-10 square inches on personal digital assistant style cellular telephones). This small display screen size limits both the amount of information that may be presented from any one standby screen application at a given time, as well as the number of standby screen applications that may simultaneously display information to a user.

A second challenge associated with getting the most out of standby screen applications in a mobile cellular telephone context is that many users carry their cellular telephones with them during most waking hours, seven days a week. As such, the type of information that may be of value to a user tends to change over time. Thus, in the cellular telephone context, it may be more of a challenge to consistently provide the user with information that is relevant to the user's current activities, as the activities may change more often than, for example, the activities that the user is engaged in while in front of their computer at work.

Thus, according to certain embodiments of the present invention, cellular telephones (and related methods) are provided in which the information from the standby screen application(s) that is displayed is automatically (i.e., without user input or intervention) changes according to specific parameters such as the time of day, the day of the week, the location of the user, the presence of other individuals, etc. Typically, information from only one or a few of the standby screen applications will be displayed on the standby screen at any given time. The cellular telephone, however, will sense when different pre-defined criteria have been met and then automatically replace the information included on the standby screen from one or more standby screen applications with information from one or more different standby screen applications in order to provide the user with information that is most likely to be relevant at any given time.

Figure 2:
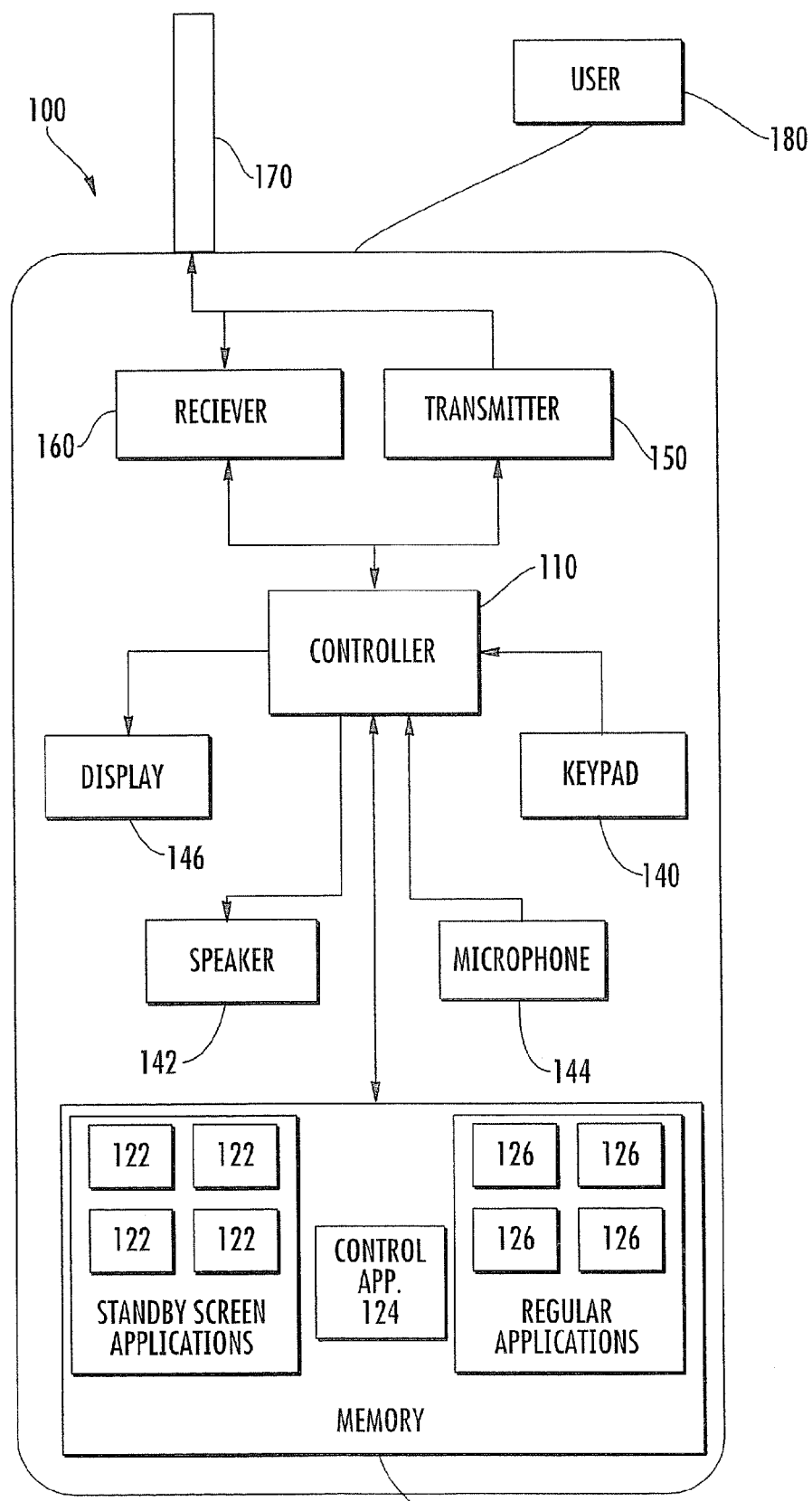
FIG. 2 is a block diagram of cellular telephones according to some embodiments of the present invention.

FIG. 2 is a block diagram of a cellular telephone 100 according to certain embodiments of the present invention. As shown in FIG. 2, the cellular telephone 100 includes a controller 110, which may comprise, for example, a microprocessor, a microcontroller or a similar data processing device that executes program instructions stored, for example, in a memory 120 of the cellular telephone 100. The memory 120 may comprise, for example, a non-volatile memory such as a flash memory, a dynamic random access memory (DRAM), an electrically erasable programmable read only memory (EEPROM), a read only memory or any other memory or storage device or combination of memory storage devices. The controller 110 is operatively associated with user interface components such as, for example, a keypad 140, a speaker 142, a microphone 144 and a display 146, operations of which are known to those of skill in the art and will not be further discussed herein. The controller 110 also controls and/or monitors operations of a radio transmitter 150 and a receiver 160 (which collectively are referred to herein as a transceiver) that may respectively transmit and receive radio frequency (RF) signals over a communications medium via an antenna 170. The cellular telephone 100 may be associated with a user 180 who owns and/or uses the cellular telephone 100.

As shown in FIG. 2, the memory 120 may include a plurality of applications 126 that are typical of the applications provided on conventional cellular telephones. Such applications may include, for example, an address book application, a message box application, games, a digital camera application, an internet browser application, control setting applications, call listing applications, etc. One or more of the applications 126 may control operations of the cellular telephone 100. The applications 126 will not be described further herein as the operations thereof are generally well understood in the art.

As is further shown in FIG. 2, the memory 120 may also include a plurality of standby screen applications 122 that may be executed by the controller 110 when the cellular telephone 100 is in the standby mode. Typically, each of the plurality of standby screen applications 122 will comprise a stand alone, separately executable application. However, it will be appreciated that one or more of the plurality of standby screen applications 122 may be implemented as a single, more complex application, that implements the functionality of what would otherwise be two or more stand-alone standby screen applications 122. Herein, where the functionality of two or more of the standby screen applications 122 are combined into a single application, the single application may be considered to be a "plurality" of standby screen applications 122 as the single application implements the functionality of multiple of the standby screen applications 122.

As is also shown in FIG. 2, the memory 120 may also include a standby screen control application 124. The standby screen control application 124 may control what information provided by the various standby screen applications 122 is displayed on the standby screen at any given time. In certain embodiments of the present invention, the standby screen control application 124 may include a plurality of pre-defined rules that are followed to determine the information that is displayed on the standby screen. As will be discussed in more detail herein, these pre-defined rules may be standard rules and/or customized rules where a user 180 of the cellular telephone 100 helps define the rules that select when and what information is displayed on the standby screen.

Figure 3A:
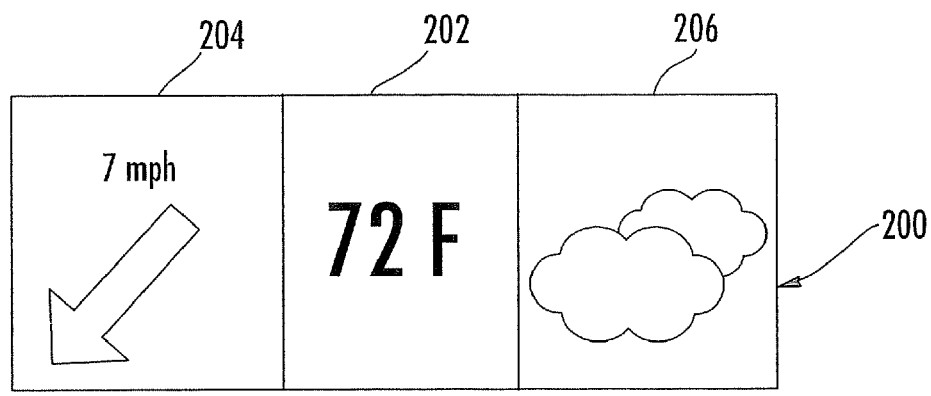
FIGS. 3A-3C are diagrams of graphical displays of information provided by standby screen applications that may be included on standby screens of cellular telephones according to certain embodiments of the present invention.

The standby screen applications 122 may include any of a wide variety of applications. As noted above, many or all of these applications may comprise widgets that provide the user 180 with "at-a-glance" information. In certain embodiments of the present invention, one of the standby screen applications 122 may comprise a current weather widget 130 that generates current weather information such as, for example, the current temperature, the wind speed, the wind direction, the relative humidity, the current wind chill reading, the current barometric pressure and direction of change of the barometric pressure and/or the current overall weather condition (e.g., sunny, partly cloudy, raining, snow, etc.). Some or all of this current weather information may be consolidated into an easy to read graphical display that may be included on a portion of the standby screen, such as, for example, the graphical display 200 illustrated in FIG. 3A. As shown in FIG. 3A, the exemplary graphical display 200 includes a display of the current temperature 202, a display of the current windspeed and direction 204, and a display of the current weather conditions 206. The graphical display 200 primarily uses graphical icons to summarize the current weather information in an easy to read fashion. The current weather widget 130 may, for example, obtain the current weather information over the cellular network and/or by accessing publicly available information on, for example, the Internet. It will be appreciated that the same current weather information may be provided for everyone in a general area (e.g., a metropolitan area) or, alternatively, location information associated with the cellular telephone 100 may be obtained and the current conditions measured at a weather monitoring station that is closest to the current location of the cellular telephone 100 may be accessed to obtain the current weather information provided by current weather widget 130.

Figure 3B:
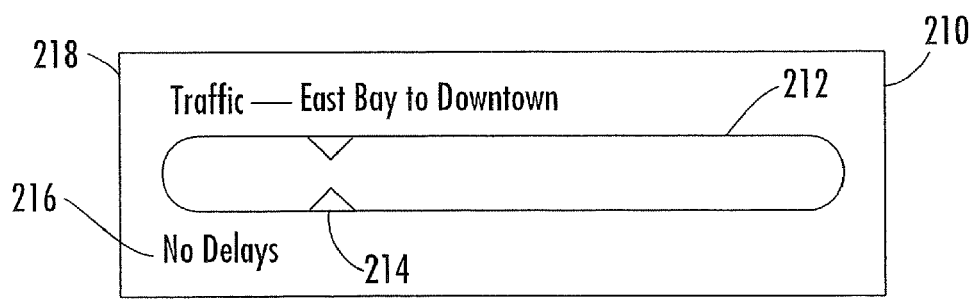

The standby screen applications 122 may also include a traffic widget 132 that displays traffic information that may be relevant to the user 180 of the cellular telephone 100. The traffic information may be consolidated into an easy-to-read graphical summary that is displayed on a portion of the standby screen such as, for example, the exemplary traffic summary 210 illustrated in FIG. 3B. As shown in FIG. 3B, in this particular embodiment, the traffic summary 210 may include a linear scale 212 that corresponds to the intensity of the traffic, and an indicator 214, that shows the current traffic intensity relative to the linear scale 212. The traffic summary 210 may also include, for example, further information 216 regarding the current traffic conditions and/or an indication 218 of the region for which the traffic summary applies. In other embodiments (which are not depicted in FIG. 3B), the traffic widget 132 may generate a traffic summary which displays a map of an area of interest to the user 180 (e.g., the route from the user's home to the user's office) with areas where traffic incidents (accidents, stalled cars, etc.) have occurred and/or where points of congestion currently exist highlighted on the map.

Figure 3C:
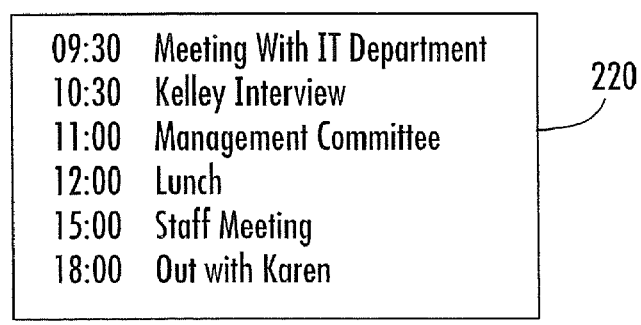

As another example, the standby screen applications 122 may also include a calendar widget 134 that displays information from an appointment book application 126 that is provided on the cellular telephone 100. The calendar widget 134 may comprise a stand alone widget or may be implemented as part of, for example, the appointment book or calendar application 126. As shown in FIG. 3C, the calendar widget 134 may display on a portion of the standby screen a listing 220 of upcoming appointments. This listing 220 may be a succinct listing that provides "at-a-glance" information to the user 180. The standby screen applications 122 may also include a task widget 136 that displays information from a task list application 126 that is provided on the cellular telephone 100.

Another example of a standby screen application 122 according to certain embodiments of the present invention is a message widget 138. The message widget 138 may, for example, display in a window on the standby screen the sending party name, message title and date and/or time received of unread messages such as e-mail, text and/or SMS messages. In some embodiments, the message widget 138 may display information for only the last received message. In other embodiments, the message widget 138 may display information for multiple messages such as, for example, the last five (or some other number) of received, but unread messages. The message widget 138 may be configured to display the above-discussed information for a predetermined time after receipt of a message (e.g., 5 minutes), until the user 180 actively clears the display (e.g., by tapping on a close display icon) and/or until the pre-defined rules are satisfied such that information from another of the standby screen applications 122 replaces the information provided by the message widget 138.

In certain embodiments of the present invention, the cellular telephone 100 may automatically notify the user 180 when the information displayed on the standby screen changes. In some embodiments, this notification may comprise an audible alert (which the user 180 may customize in terms of both the sound and volume) or activation of a vibration device included in the cellular telephone 100. This notification may be provided each time the information displayed on the standby screen changes, or only when certain information is added to the display screen (e.g., information provided by a presence widget). The notification may also only be provided during selected hours of the day (e.g., the notification function may be turned off from 10:00 pm until 7:00 am each day). This notification feature may be used, for example, with the message widget 138 to notify the user 180 that information regarding a recently received message is displayed on the standby screen. In some embodiments of the present invention, a notification is provided at least some of the time after a message is received, and the information provided by the message widget 138 is displayed for a pre-selected amount of time and then replaced with other information.

In some embodiments of the present invention, the user 180 of the cellular telephone 100 may help customize operation of the standby screen control application 124 in order to increase the relevance and/or usefulness of the information displayed on the standby screen. By way of example, with respect to the traffic widget 132 described above, the user 180 may input into the control application 124 the locations of places that the user 180 frequently travels to such as, for example, the locations of his or her home and office and/or routes that the user 180 frequently travels. To the extent that detailed traffic information is available from, for example, a relevant department of transportation or other source, the traffic widget 132 may provide a traffic summary that is customized based on a particular route that the user 180 is most likely to travel. For example, on weekday mornings, the control application 124 could instruct the traffic widget 132 to obtain traffic information for a pre-defined route from the user's home to office. In this manner, the traffic summary 210 provided by the traffic widget 132 would not simply display generalized information that summarized the average traffic intensity over some region, but instead could provide a summary that is based on known accidents and/or traffic flow parameters on the actual route that the user 180 takes each morning to work. On weekday evenings, the control application 124 could similarly instruct the traffic widget 132 to obtain traffic information for a pre-defined route from the user's office back to the user's home. In alternative embodiments, the control application 124 could make the home and office locations directly available to the traffic widget 132 so that the traffic widget 132 could automatically obtain the most relevant traffic information without input and/or instructions from the control application 124.

The control application 124 may consider a number of different parameters in determining what information to include on the standby screen at any given time. One category of parameters that will often be considered is temporal parameters such as the time of day, the day of the week and/or the day of the year. Many individuals generally follow fixed schedules throughout much of their day, waking at the same time, traveling to and from work or school at approximately the same time, eating meals at approximately the same time, etc. However, these patterns may change on particular weekdays, on weekends, etc. Pursuant to embodiments of the present invention, information regarding these patterns may be programmed into or otherwise made available to the control application 124. The control application 124 may then use this information to select the information that is displayed on the standby screen at any given time that is likely to be the most relevant information to the user 180.

Another parameter that may be considered by the control application 124 in determining what information to include on the standby screen at any given time is the current location of the cellular telephone 100. This location information may be obtained in a variety of ways known to those of skill in the art including, for example, by obtaining the location information directly from a Global Positioning Satellite receiver that is collocated and/or part of the cellular telephone 100 or by determining an approximate location of the cellular telephone 100 based on the respective strengths of signals received from multiple cellular base stations and the known locations of those base stations. This location information may be combined, for example, with other stored location information in determining what information to display on the standby screen. For example, when the location of the cellular telephone 100 matches a pre-stored location of the user's office, the control application 124 may display information provided by work-related widgets on the standby screen such as a calendar widget 134, a task widget 136, a message widget 138, etc.

Yet another parameter that may be considered by the control application 124 in determining what information to include on the standby screen at any given time is the location of other selected individuals ("presence information") as determined, for example, by a measured or calculated location of each individual's cellular telephone 100. For example, upon receiving notification (or detecting) that a pre-selected friend or family member of user 180 is nearby, the control application 124 may display information provided by a presence widget 137 such as the name and current location of the nearby pre-selected friend or family member.

It will also be appreciated that numerous other parameters may be considered by the control application 124 in determining what information to include on the standby screen at any given time. Such parameters may include, for example, a certain condition being met. By way of example, the user 180 may want to be notified when the outside temperature reaches or exceeds a certain level (e.g., 90° F.). The current weather widget 130 or some other application may monitor a third party server or other information source for temperature data, and upon detecting that the temperature has exceeded 90° F., the pre-defined rules may be set tip so that a message or icon is displayed on the standby screen that notifies the user that the outside temperature has reached 90° F. In addition, input from the user may also comprise one or more of the parameters that are considered. By way of example, the user 180 could input into the control application 124 (by a voice command, selecting a menu option or other conventional techniques for making a selection or entering information) an indication that the user 180 is currently involved in work activities. This input information could then be considered in determining the information that is displayed on the standby screen. A wide variety of information may be input by a user 180 according to certain embodiments of the invention including, for example, mood data (happy, sad, etc.) or current activity data (work, social, home, etc.).

The control application 124 applies one or more criteria to the selected parameters to determine the information that is displayed on the standby screen at any given time. As noted above, these criteria may comprise a set of pre-defined rules that select the information that is displayed. It will also be understood that this set of pre-defined rules may consider a combination of different parameters to determine the information that is displayed at any given time on the standby screen. By way of example, the set of pre-defined rules may consider the time of day, the day of the week and the location of the user 180 to determine whether or not to display information provided by the calendar widget 134 on the standby screen. As a specific example, in one relatively simple embodiment, if the day of the week is a weekday, the time of day is between 7:00 a.m. and 6:30 p.m. and the location of the user 180 is within 1 mile of the user's office, then information provided by the calendar widget 134 is displayed on the standby screen. The totality of rules that are used to determine the information that is displayed on the standby screen may also be quite complex. For example, the sensing of the nearby presence of one or more selected individuals could override the rule specifying that the information from the calendar widget 134 is displayed. The importance of the information content provided by the standby screen applications 122 could also be considered by the rules that are used to determine the information that is displayed on the standby screen. By way of example, identification by the traffic widget 132 that traffic conditions are very congested or that an accident has occurred on a route that is often taken by the user 180 could increase the probability (or mandate) that such information from the traffic widget 132 is selected for display on the standby screen.

As shown in FIGS. 3A-3C, the standby screen applications 122 provide information that may be displayed to the user 180 on a display of the cellular telephone 100. It will be appreciated that each individual standby screen application 122 may format the information as it appears on the display or that instead the control application 124 or some other application may perform this formatting function.

While the standby screen applications 122 provided in embodiments of the present invention may be designed to provide relevant information to a user 180 while the cellular telephone 100 is in standby mode, it will be appreciated that one or more of the standby screen applications 122 may also provide information to the user 180 when the cellular telephone 100 is in a mode other than standby mode (e.g., while the user is engaged in a voice communication and/or when the user is actively using one of the applications 126).

FIGS. 4A-4C are illustrations showing how the standby screen that is displayed on a cellular telephone 100 according to embodiments of the present invention may change over time as information from different of the standby screen applications 122 replaces information provided by other of the standby screen applications 122. In particular, FIG. 4A shows the contents of the standby screen 300 of the cellular telephone 100 at 7:15 a.m. on a particular workday. As shown in FIG. 4A, the standby screen 300 includes an upper display bar 310 that includes a number of items that are often provided on the standby screen of conventional cellular telephones, including a signal strength icon 312, a network or protocol icon 314, a message indicator 316 (indicating that the user 180 currently has one or more unopened messages), an instant message status icon 318, a Bluetooth enabled icon 320 and a remaining battery power icon 322. The standby screen 300 also includes a lower display bar 330 that includes several labels 332, 334, 336. Each label comprises a label for a "soft key" on the keypad located under each of the respective labels 332, 334, 336. Pressing the soft key associated with label 332 opens up a call list that displays recent outgoing and/or incoming calls. Pressing the soft key associated with 334 opens up a main menu of the cellular telephone 100 from which the user 180 may access, for example, various of the applications 126. Pressing the soft key associated with the label 336 provides the user 180 access to a widget menu that allows the user 180 to select and open any of the standby screen applications 122.

As is also shown in FIG. 4A, the standby screen 300 also includes a main window 340. A display 342 of the current time, day of the week and day of the month is provided at the upper-right side of the main window 340. The name of the cellular service provider is displayed in a display box 344 at an upper-left side of the main window 340. The main window 340 also may include one or more background pictures or patterns 346. Finally, the main window 340 includes one or more displays 350 of information provided by one or more of the standby screen applications 122.

In the example of FIG. 4A, a single display 350 is provided that includes an upper part 352 and a lower part 354. The upper part 352 of the display 350 includes current traffic information provided by a traffic widget 132. As the traffic summary included in upper part 352 of display 350 has already been described above with respect to FIG. 3B, no further description will be provided here. The lower part 354 of the display 350 includes current weather information provided by the current weather widget 130. As the current weather summary included in the lower part 354 of display 350 has likewise already been described above with respect to FIG. 3A, no further description will be provided here.

Note that the standby screen 300 of FIG. 4A provides information that may be particularly relevant to the user 180 at 7:15 a.m. on a weekday morning. As the user 180 gets ready for work he or she can, at a glance, obtain weather information that may help him or her decide what to wear, whether to take an umbrella, etc. The user 180 is also provided with traffic information that may allow the user 180 to better assess the time at which they will need to leave for the office. All of this information is provided in an easy-to-read format. In this particular example, the control application 124 displays the information from the weather widget 130 and the traffic widget 132 based on pre-defined rules that select weather and traffic information for display at certain times of day on selected days of the week. However, it will be appreciated that, in other embodiments, other and/or additional parameters such as, for example, the location of the user 180 may instead cause the control application 124 to display information provided by the current weather and/or traffic standby screen applications 130, 132.

FIG. 4B depicts the exemplary contents of a standby screen 300' at 8:55 a.m. on the same day. As can be seen from FIG. 4B, the contents of the standby screen 300' are generally the same as the contents of the standby screen 300 depicted in FIG. 4A except that the display 350 from FIG. 4A has been replaced with a display 360 that displays information provided by the calendar widget 134. Here, the pre-defined rules applied by the control application 124 may, for example, have replaced the information provided by the weather and traffic widgets 130, 132 with the information provided by the calendar widget 134 based on, for example, sensing that the user 180 has arrived at their office, on a weekday. At this time, on a weekday, the appointment information provided on the display 360 may be highly relevant and/or useful to the user 180.

FIG. 4C depicts the exemplary contents of a standby screen 300" at 12:23 p.m. on the same day. As can be seen from FIG. 4C, the contents of the standby screen are generally the same as the contents of the standby screen 300 depicted in FIG. 4B except that the display 360 from FIG. 4B has been replaced with a display 370 that displays information regarding the location of selected, pre-defined individuals. The information provided in the display 370 includes a listing of the names of the individuals 372, information regarding the location of each individual 374 and an icon 376 that is associated with each listed individual. The location information 374 may be provided by the cellular service provider based on, for example, location information generated by a GPS receiver associated with a cellular telephone of each of the selected individuals. The location information 374 may be expressed as a distance from the location of the cellular telephone 100 and/or as the name of a place associated with the location of the selected individual's cellular telephone. Thus, for example, "Mike's" location is expressed in the display 370 both in terms of a physical location ("Georgie's) and as a distance (0.3 miles) from the cellular telephone 100. In embodiments of the present invention, the location information 374 would only be provided in instances where each of the listed individuals had given consent to the cellular service provider to provide such information to the user 180.

The icons 376 in FIG. 4C may have a variety of meanings depending upon the particular embodiment of the present invention. In the depicted embodiment, the color of the icon depicts a category that the individual falls into. In this particular example, the color green designates friends and the color red designates co-workers. In other embodiments, the color or shape of the icon may serve as an indicator as to the distance of each individual from the user 180. It will also be appreciated that the icons 376 may serve other purposes as well.

In the example of FIG. 4C, the user 180 is at lunch when the display 370 is included on the main display 350 of the standby screen 300". The user 180 is conveniently notified by the display 370 that his friend Mike is at a nearby restaurant. Thus, the example of FIG. 4C further demonstrates how, according to embodiments of the present invention, the right information may be provided to the user 180 at the right time and in right context.

In embodiments of the present invention, the standby screen applications 122 may have additional functionality other than just displaying information. For example, in the situation of FIG. 4C, the user 180 may click or tap on the name Mike in portion 372 of display 370 in order to open up an instant message input screen that is pre-addressed to Mike's instant messaging address. The user 180 may then send Mike an instant message suggesting, for example, that they meet for a quick cup of coffee before returning from lunch back to work. As another example, the user 180 may tap on the display window 200 of FIG. 3A in order to obtain additional weather information such as, for example, the weather forecast for some number of upcoming days. Thus, the standby screen applications 122 according to embodiments of the present invention may provide both at-a-glance information as well as additional functionality such as, for example, the display of more detailed information.

As is clear from the above discussion, according to certain embodiments of the present invention, a user 180 may conveniently be provided with relevant information via the standby screen of the cellular telephone 100 during the time when the relevance of the information may be high. In some embodiments, the user 180 may access this information without having to navigate any menus and/or otherwise interact with the cellular telephone 100. As shown by the above examples, over the course of the day the information provided by the widgets or other standby screen applications 122 changes in order to provide the user 180 with the information that is likely to be the most relevant at any given time, location and/or other context. This is achieved by dynamically updating and replacing the displayed information based on a variety of different parameters according to pre-defined criteria/rules.

It will be appreciated that in some embodiments of the present invention the widgets and other standby screen applications 122 may all be executing on the controller 110 at any given time, while in other embodiments only a subset of the standby screen applications 122 are concurrently executed. The latter approach may be used to reduce the processing requirements of the cellular telephone 100. In such embodiments, the only standby screen applications 122 executing on the controller 110 at a given time may, for example, be the standby screen applications 122 that are currently providing information that is included on the standby screen 300 along with any standby screen applications 122 that monitor for information that might result in a change in the information provided to the user (such as, for example, a presence widget 137 and/or a message widget 138).

As discussed above, the information provided by the standby screen applications may be displayed at least while the cellular telephone 100 is in the standby mode. As known to those of skill in the art, the standby mode may include both an "awake" mode in which at least one of the displays on the cellular telephone 100 is backlit or otherwise activated to provide a full color display and a "sleep" mode in which the screen is black or is black with text or graphics displayed in light gray. It will be appreciated that the information that is included on the standby screen while the cellular telephone 100 is in standby mode may be displayed in either or both the awake and sleep modes of the standby modes.

The control application 124 may come pre-programmed with a default set of rules that may be used to determine what information is displayed when on the standby screen. This default set of rules might, for example, specify that information from the current weather and/or traffic widgets 130, 132 is displayed from 5:00 a.m. until 8:00 a.m. and from 5:30 p.m. through 7:00 p.m. on weekdays, that information provided by the calendar 134 and/or task list widgets 136 are displayed from 8:00 a.m. through 5:30 p.m. on weekdays, that information from a To-Do List widget 139 and the weather widget 130 be displayed on weekends, and that information from the presence widget 137 and/or message widget 138 may act to override other information under certain, pre-defined circumstances. By providing this default set of rules, the enhanced standby screen functionality may be up and running for the user 180 as soon as he or she activates the cellular telephone 100.

As noted above, the user 180 may also be provided the capability to customize various of the features of the improved standby screen functionality provided by embodiments of the present invention. For example, the user 180 may input the location of his or her home, office and or other locations into, for example, the control application 124 and/or one or more of the standby screen applications 122. This information may then be used by the control application 124 to execute more sophisticated rules for determining when to switch between different of the standby screen applications 122. The user 180 can also input commonly used driving routes and the times and days of the week when those routes are typically driven in order to further customize, for example, when information from the traffic widget 132 is displayed and/or the traffic information that is provided by the traffic widget 132 (i.e., information that is customized for a specific route). An interface may be provided to allow the user 180 to conveniently input such customization information into control application 124. The user may similarly input information regarding individuals that are to be tracked by the presence widget 137.

In some embodiments of the present invention, the user 180 may also be provided capabilities to select one of the standby screen applications 122 so that information provided by the selected one of the standby screen applications 122 is displayed on the standby screen either temporarily and/or until closed by the user. By way of example, in the embodiment depicted in FIGS. 4A-4C, the user 180 can display a list of the available standby screen applications 122 by pressing the soft key on the keypad associated with label 136. Once this menu is displayed, the user 180 may select one of the standby screen applications 122 using, for example, conventional techniques. This selection may act to cause the information provided by the selected standby screen application 122 to be displayed within the main display 350 (either replacing the currently displayed information or added to it) of the standby screen 300.

Pursuant to further embodiments of the present invention, the user 180 may also be provided a capability to close the information displayed by a standby screen application 122 after having viewed that information. By way of example, the presence widget 137 may detect the presence of a relevant individual, and this may trigger the control application 124 to replace currently displayed information with information regarding the location of the identified individual. After the user 180 has viewed this information, the information may, in some circumstances, be considered outdated and no longer relevant. Accordingly, the user 180 may be provided a convenient mechanism for commanding the control application 124 to replace the information provided by the presence widget 137 with other information. This mechanism might, for example, involve pressing a soft key or touching a "close window" icon displayed on the standby screen 300. The user 180 may similarly replace information provided by the weather, traffic, message and/or other widgets or applications 122 after the user 180 has viewed the displayed information. When this occurs, the control application 124 may be programmed to identify a secondary standby screen application 122 that will provide information to the standby screen in the event that the primary widget or standby screen application (i.e., the widget or application 122 specified by the set of rules/parameters) is closed by the user 180.

Figure 5:
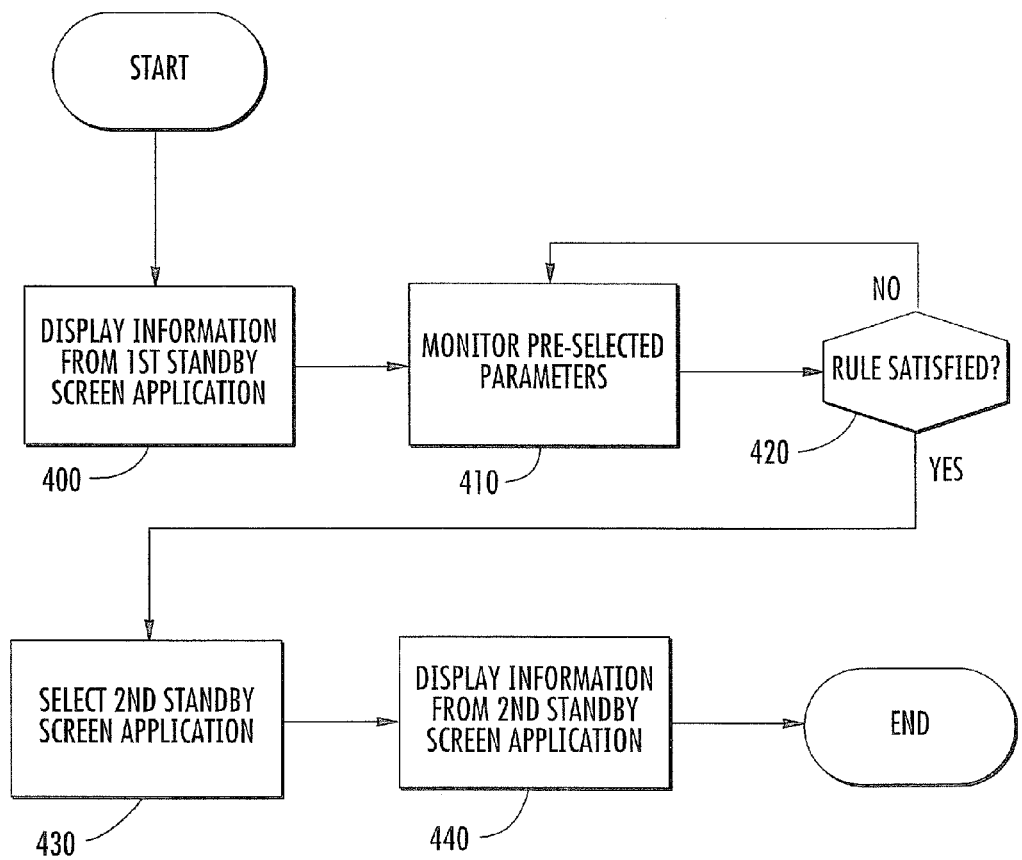
FIG. 5 is a flow chart illustrating methods of displaying information on a display of a cellular telephone according to certain embodiments of the present invention.

FIG. 5 is a flowchart illustrating methods of displaying information on a standby screen of a cellular telephone 100 according to certain embodiments of the present invention. As shown in FIG. 5, operations may begin with information provided by a first of the plurality of standby screen applications 122 being displayed on a display of the cellular telephone 100 while the cellular telephone is in standby mode (block 400). One or more pre-selected parameters are then monitored such as, for example, the time of day, the day of the week, the month, the day of the year, the location of the cellular telephone 100, the location of other cellular telephones or individuals, etc. (block 410). The monitored parameter information is input and/or compared to one or more pre-defined rules to determine if the rule(s) are satisfied such that information from another of the plurality of standby screen applications 122 should be displayed on the display of the cellular telephone (block 420). If so, a second of the plurality of standby screen applications 122 is selected (block 430), and information from the selected second of the plurality of standby screen applications 122 is displayed on the display of the cellular telephone (block 440), either by replacing the information from the first of the plurality of standby screen applications 122 or by being posted alongside or over the information from the first of the plurality of standby screen applications 122.

Typically, the information provided by the standby screen applications 122 is displayed on the display screen(s) of the cellular telephone 100. However, in some embodiments of the present invention, this information may additionally (or alternatively) be displayed on a display device of a cellular telephone accessory. By way of example, a watch 102 that includes a liquid crystal display screen 104 may communicate with the cellular telephone 100 via, for example, a Bluetooth or other wireless connection. In some embodiments, the information provided by the standby screen applications 122 may additionally or alternatively be displayed on the liquid crystal display screen 104 of the watch 102 in order to conveniently make the information available to the user 180. Thus, the information may be displayed on a display of the cellular telephone 100 and/or on one or more displays that are otherwise associated with the cellular telephone 100 via, for example, a wireless link.

The standby screen applications 122 may come preloaded on the cellular telephone 100, may be downloaded from various websites or servers and/or may be purchased from third party vendors either as a software package purchased in a store or as a downloadable application.

Herein, references are made to one or more of the standby screen applications 122 displaying "information" on the display of a cellular telephone. It will be appreciated in light of the present disclosure that, as used herein, the "information" that is displayed need not be data or text, but can be anything that is displayed on the display including, for example, text, data, icons, pictures, video clips, graphs, tables and/or the like.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of displaying information on a display associated with a cellular telephone, the method comprising:
displaying information from at least a first of a plurality of applications on the display while the cellular telephone is in a standby mode; and then
automatically selecting a second of the plurality of applications based on a set of pre-defined rules; and then
automatically replacing the displayed information from the first of the plurality of applications with information from the second of the plurality of applications while the cellular telephone remains in the standby mode;
wherein the cellular telephone is configurable to receive at least one user-provided temporal parameter to establish at least some of the set of pre-defined rules that result in the automatic selection of the second of the plurality of applications;
wherein the cellular telephone is configurable to receive at least one user-provided location parameter to establish at least some of the set of pre-defined rules that result in the automatic selection of the second of the plurality of applications;
wherein the second of the plurality of applications comprises a task list application;
wherein the at least one user-provided location parameter used to establish at least some of the set of pre-defined rules that result in the automatic selection of the second of the plurality of applications comprises at least a work location; and
wherein the at least one user-provided temporal parameter used to establish at least some of the set of pre-defined rules that result in the automatic selection of the second of the plurality of applications comprises at least a time of day and a day of the week when the task list from the task list application may be displayed.

2. The method of claim 1, wherein automatically selecting a second of the plurality of applications based on a set of pre-defined rules comprises automatically selecting the second of the plurality of applications based further on a location of the cellular telephone.

3. The method of claim 1, wherein the method is carried out by a computer program product that is stored in a memory of the cellular telephone.

4. A cellular telephone, comprising:
a processor;
a transceiver coupled to the processor;
a user interface that includes a first display coupled to the processor;
a memory coupled to the processor;
a plurality of applications that are configured to run on the processor, wherein each of the plurality of applications generate information that may be displayed on the first display when the cellular telephone is in standby mode; and
a control application that is configured to automatically adjust what of the information generated by the plurality of applications is displayed on the first display while the cellular telephone is in standby mode based on at least one of a time of day criteria, a day of the week criteria and/or criteria involving a location of the cellular telephone being satisfied.

5. The cellular telephone of claim 4, wherein the control application is configured to replace information provided by a first of the plurality of applications with information provided by a second of the plurality of applications in response to at least one of the time of day criteria, the day of the week criteria and/or the criteria involving the location of the cellular telephone being satisfied.

6. A method of displaying information on a display associated with a cellular telephone, the method comprising:

displaying information from at least a first of a plurality of applications on the display while the cellular telephone is in a standby mode; and then automatically selecting a second of the plurality of applications based on a set of pre-defined rules comprising at least one of a temporal parameter and a location of the cellular telephone; and then automatically displaying information from the second of the plurality of applications while the cellular telephone remains in the standby mode.

7. The method of claim 6, wherein the display is a display on a device separate from the cellular telephone that receives information from the cellular telephone via a wireless communications link.

8. The method of claim 6, wherein the set of pre-defined rules includes at least one rule that selects one or more of the plurality of applications based on a location of the cellular telephone relative to another location.

9. The method of claim 6, wherein the cellular telephone is configurable to receive at least one user-provided temporal parameter to establish at least some of the set of pre-defined rules that result in the automatic selection of the second of the plurality of applications; and wherein the cellular telephone is configurable to receive at least one user-provided location parameter to establish at least some of the set of pre-defined rules that result in the automatic selection of the second of the plurality of applications.

10. The method of claim 9, wherein the at least one location parameter comprises a pre-specified location, and wherein the set of pre-defined rules comprises at least one rule that selects the second of the plurality of applications based at least in part on a determination that the cellular telephone is at the pre-specified location.

11. The method of claim 9, wherein the at least one user-provided temporal parameter comprises a time of day and a day of the week.

12. The method of claim 6, wherein automatically selecting a second of the plurality of applications based on a set of pre-defined rules comprises automatically selecting the second of the plurality of applications based on the location of a person other than the user of the cellular telephone, and wherein the information from the second of the plurality of applications comprises at least a name and a location of the person other than the user of the cellular telephone.

13. The method of claim 6, wherein the second of the plurality of applications comprises a traffic application, and wherein the cellular telephone is configurable to receive as parameters to establish at least some of the set of pre-defined rules that result in the automatic selection of the traffic application: a home address, a work address, and a time when the information from the traffic application may be displayed.

14. The method of claim 6, wherein the second of the plurality of applications comprises a task list application, and wherein the cellular telephone is configurable to receive as parameters to establish at least some of the set of pre-defined rules that result in the automatic selection of the task list application: a work address, a time when the task list application may be displayed, and a distance from the work address within which the task list application may be displayed.

15. The method of claim 6, wherein the second of the plurality of applications comprises a calendar application, and wherein the cellular telephone is configurable to receive as parameters to establish at least some of the set of pre-defined rules that result in the automatic selection of the calendar application: a work address, and a distance from the work address within which the calendar application may be displayed.

* * * * *

UNITED STATES PATENT AND TRADEMARK OFFICE
CERTIFICATE OF CORRECTION

PATENT NO.        : 7,657,281 B2                                    Page 1 of 1
APPLICATION NO.   : 11/619800
DATED             : February 2, 2010
INVENTOR(S)       : Anders Bertram Eibye It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 499 days.

Signed and Sealed this

Thirtieth Day of November, 2010

David J. Kappos
*Director of the United States Patent and Trademark Office*